United States Patent [19]
Satoh et al.

[11] Patent Number: 6,069,431
[45] Date of Patent: May 30, 2000

[54] SYNCHRONOUS GENERATOR

[75] Inventors: Yoshio Satoh; Hideo Kawamura, both of Kanagawa-ken, Japan

[73] Assignee: Isuzu Ceramics Research Institute Co., Ltd., Kanagawa-ken, Japan

[21] Appl. No.: 09/020,296

[22] Filed: Feb. 6, 1998

[51] Int. Cl.[7] .............................. H02K 3/46; H02K 1/04; H02K 15/12; H02K 1/12
[52] U.S. Cl. .............................. 310/260; 310/43; 310/44; 310/256
[58] Field of Search ...................................... 310/209, 162, 310/44, 211, 213, 68 D, 68 R, 107, 111, 124, 125, 182, 191, 197, 225, 261, 264, 260, 183, 256, 43, 270, 45; 363/37, 97; 318/803, 806, 812, 938

[56] References Cited

FOREIGN PATENT DOCUMENTS 9-149577  6/1997  Japan .

*Primary Examiner*—Nestor Ramirez
*Assistant Examiner*—Dang Dinh Le
*Attorney, Agent, or Firm*—Browdy and Neimark

[57] ABSTRACT

A synchronous generator which is driven by an engine whose rotation variation is large and which can easily incorporate an output voltage stabilization circuit. In this synchronous generator, magnetism shorting paths for a magnetic field produced by the armature coil is formed without changing the armature specifications. Magnetic fluxes produced by currents flowing in the armature coils can easily pass through the magnetism shorting paths, thereby increasing the equivalent inductance value and improving the frequency characteristic of the inductance. This in turn improves the voltage step-up chopper characteristic during generation to stabilize the generated voltage of the synchronous generator driven by, for example, an automobile engine that widely varies in revolution speed.

6 Claims, 5 Drawing Sheets

SYNCHRONOUS GENERATOR

BACKGROUND OF THE INVENTION

FIELD OF THE INVENTION

The present invention relates to a synchronous generator that is driven by a power source with large revolution speed variations, such as internal combustion engines, and which can easily incorporate an output voltage stabilizing circuit.

DESCRIPTION OF THE PRIOR ART

Recent years have seen car-mounted equipment continue to increase their capacities to enhance the added value of automobiles. There are growing demands for a small, high-output synchronous generator capable of supplying sufficient electricity to the car-mounted equipment. As shown in FIG. 8, a synchronous generator 10 comprises a rotor 4 made of a permanent magnet and mounted on a rotating shaft 3, and an armature 1 having armature coils 2 arranged around the rotor 4.

The synchronous generator changes its output voltage in proportion to revolution speed. When it is driven by an engine of an automobile, because the engine revolution varies largely in a range from 500 rpm to several thousand rpm according to load, the output voltage of the synchronous generator varies greatly accordingly. Thus, if the generated power is to be used as a commercial power supply, a constant voltage controller comprising a voltage step-up (or step-down) means is required.

Hence, it is essential with the synchronous generator that the generated power be regulated into a constant voltage, and thus a voltage stabilization means such as a voltage stabilizer and a complex control circuit need to be added, making the equipment as a whole large and expensive.

To solve the above problem, a voltage step-up chopper for the synchronous generator has been developed which raises the voltage when the generated voltage is low by using an inductive component of the armature coils and controls the voltage rise factor according to the engine revolution to maintain the generator voltage at a constant value at all times.

The step-up chopper has a limitation that because the inductance of the armature coils 2 of the synchronous generator 10 utilizes a leakage inductance produced by a leakage flux of coil ends 24 of the armature coils 2 outside the armature 1, the inductance cannot be made large. Another problem is that its frequency characteristic is bad. As a result, during operation the step-up chopper has a narrow voltage stabilization range, which in turn makes it impossible to increase the power capacity.

Although the leakage inductance is known to be able to be increased by providing magnetism shorting paths using a soft ferrite at the ends of slots in the armature of the synchronous generator, there is a problem that the flux from the magnet does not pass through the coil before reaching the other magnet pole, deteriorating the power generation.

SUMMARY OF THE INVENTION

In a synchronous generator which has a voltage step-up chopper that utilizes a leakage inductance of armature coils of an armature and a voltage step-up and rectifying circuit that controls a voltage step-up factor according to the generated voltage by the step-up chopper to stabilize the generated voltage even when the revolution speed varies; this invention relates to a synchronous generator whose armature has magnetism shorting paths that easily pass only the fluxes generated by currents flowing through the armature coils.

The voltage step-up and rectifying circuit comprises: a three-phase full-wave rectifying circuit having first diodes; a power transistor connected in parallel with the output side of the three-phase full-wave rectifying circuit and forming a switching device that performs the voltage step-up chopping; a single second diode connected to the positive output side of the power transistor; a voltage detecting circuit that detects a voltage output from the second diode; and a voltage step-up control circuit that controls the power transistor.

When the generated voltage after being converted into DC voltage at the output side (point A of FIG. 6) of the second diode does not reach a target voltage, the voltage step-up control circuit turns on or off the power transistor to raise the generated voltage.

The magnetism shorting paths are provided at the ends of the armature coils to increase inductance of the armature coils and are made of a hardening resin mixed with a powder of soft magnetic material such as ferrite. The hardening resin can be fabricated by filling a hardening liquid mixed with soft magnetic powder into the end portion of the wound coil of the armature and then hardening it. The inductance and frequency characteristic of the hardening resin can be changed freely by changing the amount and material of the magnetic powder.

Alternatively the magnetism shorting paths comprise magnetic rings with a notch which are inserted into the coil end portions of the armature coils through the notch.

Further, the magnetism shorting paths may be formed of armature end plates mounted to the armature that connect the free ends of teeth made of high silicon steel or soft magnetic material with high permeability and good frequency characteristics. The armature end plates passes only the fluxes produced by the armature coils and equivalently establish a state where inductance is inserted in series with the armature coils. The core material of the armature end plate uses, as described above, high silicon steel and soft ferrite to improve the frequency characteristic of inductance and therefore the voltage step-up chopper characteristic during generation, thus stabilizing the generated voltage of the synchronous generator driven by engines whose service revolution range is wide, such as internal combustion engines of automobiles.

The synchronous generator constructed as described above can improve the frequency characteristic of inductance equivalently inserted in series with the armature coils and increase the inductance value simply by adding the magnetism shorting paths of a magnetic material to the end portions of the armature coils or to the ends of the armature without changing the armature specifications.

This synchronous generator not only can use the inductive component of the armature coils as the inductance of the voltage step-up circuit and realize the voltage step-up circuit without adding a new independent inductance but also can easily change the magnetic characteristic of the added magnetic material. This increases the freedom of design of the voltage step-up chopper circuit.

Because this synchronous generator is suited for the voltage step-up chopper, it is possible to generate an electric power having a stable output voltage in a synchronous generator driven by a power source with large rotation speed variations, such as internal combustion engines of automobiles.

DESCRIPTION OF THE PREFERRED EMBODIMENTS

One embodiment of the synchronous generator according to this invention will be described by referring to the accompanying drawings.

Before we go into detail of the synchronous generator of this invention, one example of the voltage controller for the step-up chopper will be explained by referring to FIG. 6.

Figure 6:
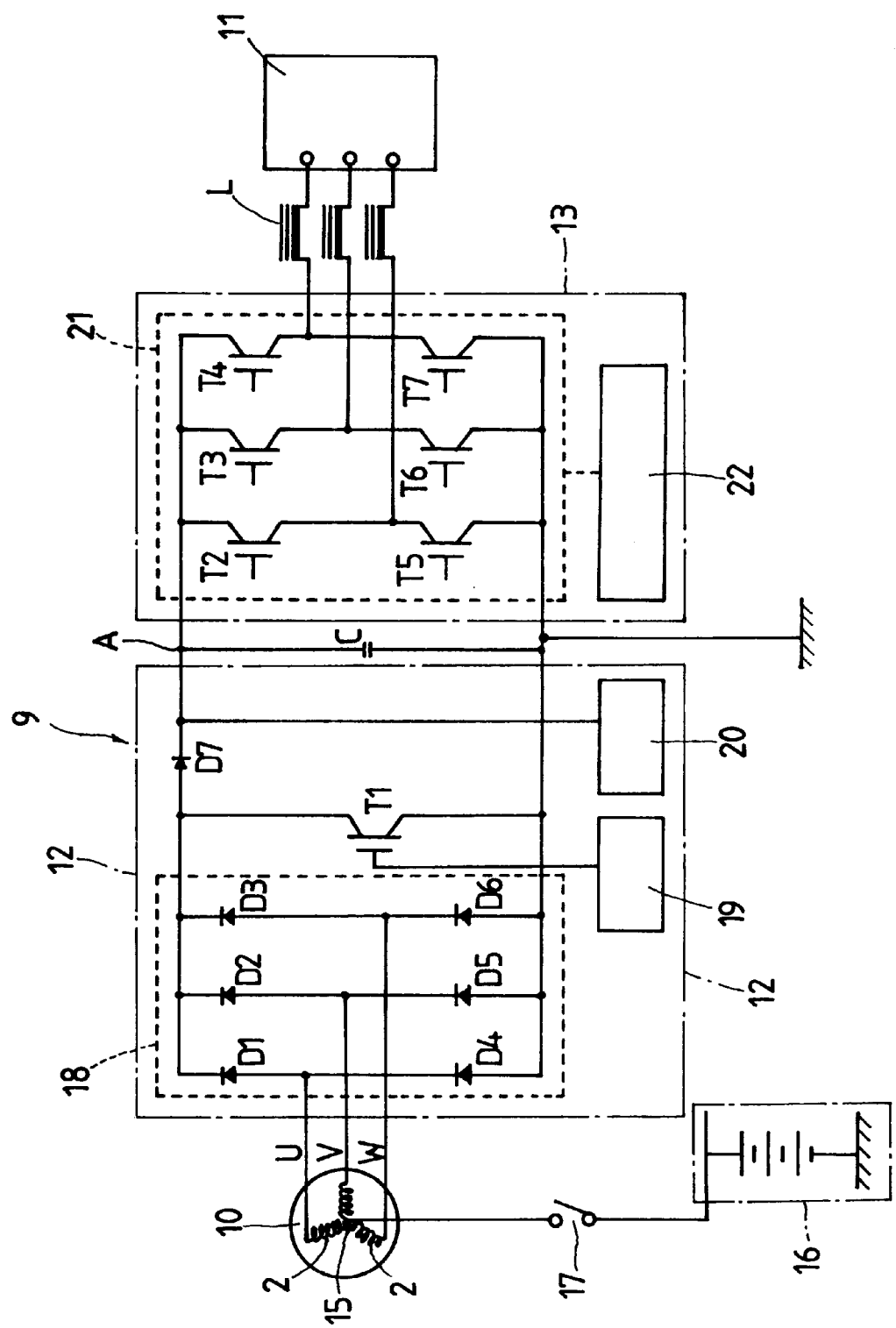
FIG. 6 is a circuitry representing one example of a voltage controller of a permanent magnet type synchronous generator.

As shown in FIG. 6, the voltage controller 9 controls the voltage of the permanent magnet type synchronous generator 10 driven by an automotive engine so that it can be used as a commercial power supply 11. The voltage controller 9 can reduce the number of large-current switching devices (power transistors T1) to one, making the controller small in size, light in weight and economical.

The voltage controller 9 comprises: a voltage step-up and rectifying circuit 12 to raise the voltage of the power generated by the permanent magnet type synchronous generator 10 and rectify the raised voltage; a smoothing capacitor C connected in parallel with the output side of the voltage step-up and rectifying circuit 12; a conversion circuit 13 connected to the output side of the smoothing capacitor C which converts the output from the voltage step-up and rectifying circuit 12 into a three-phase AC power by the pulse width modulation control and which has a voltage step-down function; and an inductance L connected in series with the output side of the conversion circuit 13. The inductance L may or may not have to be provided depending on a device connected on the output side.

The permanent magnet type synchronous generator 10, as shown in FIG. 1 to FIG. 4 in particular, comprises a rotor 4 made of a permanent magnet and an armature 1 made of armature coils 2, and produces a three-phase output. A neutral point 15 of the armature coils 2 is connected with a DC power supply 16 through a switch 17.

The voltage step-up and rectifying circuit 12 raises the three-phase output voltage of the power generated by the permanent magnet type synchronous generator 10 and comprises a three-phase full-wave rectifying circuit 18 including six diodes D1, D2, D3, D4, D5 and D6; a power transistor T1 connected in parallel with the output side of the three-phase full-wave rectifying circuit 18 and forming a switching device to perform a voltage step-up chopping; one diode D7 connected to the positive output side of the power transistor T1; a voltage detection circuit 20 to detect the voltage output from the diode D7; and a voltage step-up control circuit 19 to control the power transistor T1.

Next, the operation of the voltage step-up and rectifying circuit 12 will be explained.

An output power P and an output voltage Vo are expressed as follows.

$$P = \frac{1}{T_{ON} + T_{OFF}} \left( \frac{V_1^2}{2L} T_{ON}^2 + \frac{V_1^2}{2L} \times \frac{Vo}{Vo - V_1} \times T_{ON}^2 \right)$$

$$Vo = \frac{V_1 \times T_{ON}^2}{2IoL(T_{ON} + T_{OFF}) + V_1}$$

where L is a leakage inductance of the armature coils of the synchronous generator, $T_{ON}$ is an ON time of the switching device (power transistor T1), $T_{OFF}$ is an OFF time of the switching device (power transistor T1), and $V_1$ is a generator induced voltage.

From the above equations, the output power P and the output voltage Vo are determined by the inductance and the ratio of the ON time $T_{ON}$ to OFF Time $T_{OFF}$ during switching. To maintain the constant voltage output even when the input voltage increases, $T_{ON}$ needs to be reduced and L increased.

This condition must be satisfied. For the voltage step-up function to work properly when $T_{ON}$ is reduced, the inductance must be ideal in the frequency range used and thus an improvement of the frequency characteristic is essential. For the stabilization of the output, the current I flowing in the inductance needs to be continuous. The condition that meets this requirement is expressed as follows.

Figure 7:
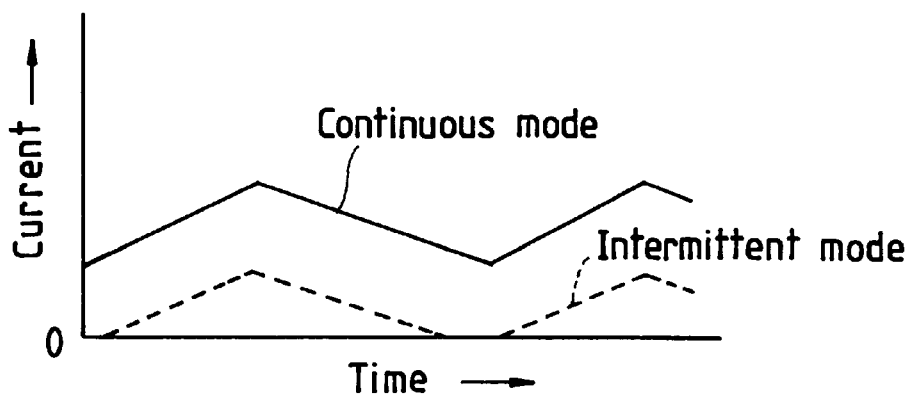
FIG. 7 is a graph showing an average value of current over time in the voltage controller of the permanent magnet type synchronous generator of FIG. 6.
Figure 8:
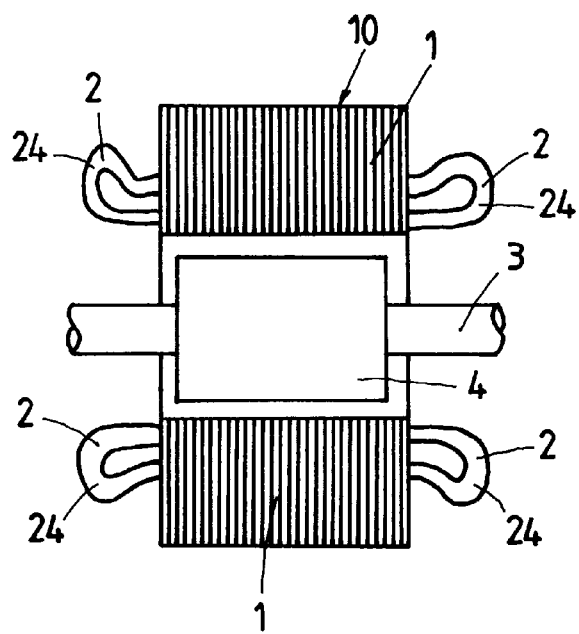
FIG. 8 is a schematic view of a conventional synchronous generator.

FIG. 7 shows a continuous mode by a solid line and an intermittent mode by a dashed line. As shown in FIG. 7, with elapse of time the average current value will not become zero in the continuous mode, whereas the average current value in the intermittent mode may become zero.

$$I > \frac{Vo}{2L} \times T_{ON}$$

Likewise, to maintain the stability of the output even when the load current is increased when the output voltage P is constant, improvements of inductance frequency characteristic and of inductance value are essential.

$$Vo = \frac{T_{ON} + T_{OFF}}{T_{OFF}} \times V_1$$

$$\dots \left( \text{Continuous mode } Io > \frac{Vo}{2L} \times T_{ON} \right)$$

$$Vo = \frac{(V_1 \times T_{ON})^2}{2IoL(T_{ON} + T_{OFF})} + V_1$$

$$\dots \left( \text{Intermittent mode } Io < \frac{V_1}{2L} \times T_{ON} \right)$$

The current average value $I_{AV}$ and the current value $I_v$ in the intermittent mode are as follows.

$$I_{AV} = I_V + \frac{V_1}{2L} \times T_{ON} = Io$$

$$I_V = I_O - \frac{V_1}{2L} \times T_{ON}$$

When the DC-converted generated voltage at the output side of the diode D7 (point A in the circuit of FIG. 6) does not reach the target voltage, the voltage step-up control circuit 19 performs ON/OFF operation on the power transistor T1 to increase the generated voltage of the synchronous generator 10.

When the power transistor T1 is turned on, the output of the synchronous generator 10 is short-circuited and the short-circuit current flows into the armature coils 2 of the synchronous generator 10, storing energy in the leakage inductance of the armature coils 2. Next, when the power transistor T1 is turned off, the stored energy is released to raise the output voltage. When the generated voltage at point A is higher than the target voltage, the ON/OFF operation of the power transistor T1 is stopped. In this way, the output of the synchronous generator 10 is rectified into DC voltage by the three-phase full-wave rectifying circuit 18, with the voltage raised or unchanged, and sent out to the inverter circuit 21 of the conversion circuit 13.

The voltage step-up control circuit 19 performs as follows.

In a half cycle where the voltage between line U and line V of the synchronous generator 10 is positive, the voltage step-up control circuit 19 issues a base switching signal to the power transistor T1 in a rectifying circuit ranging from the diode D1 to the power transistor T1 to the diode D5. Upon receiving this signal, the power transistor T1 turns on, short-circuiting the output of the synchronous generator 10. As a result, a short-circuit current flows in the armature coils 2 of the synchronous generator 10 storing a large energy in the armature coils 2 as they have an inductive component. Next, when an OFF signal is issued to the power transistor T1, the power transistor T1 is turned off releasing the energy stored in the armature coils 2 through the diode D7. At this time, the energy stored in the armature coils 2 works as a counter electromotive voltage, which is added to the normally generated voltage from the synchronous generator 10, thus producing a DC voltage higher than the voltage obtained by rectifying the normally generated voltage.

In the next half cycle where the voltage between line U and line V of the synchronous generator 10 is negative, the voltage step-up control circuit 19 issues a base switching signal to the power transistor T1 in a rectifying circuit ranging from the diode D2 to the power transistor T1 to the diode D4. On receiving this signal, the power transistor T1 turns on, short-circuiting the output of the synchronous generator 10. As a result, a short-circuit current flows through the armature coils 2 of the synchronous generator 10, storing a large energy in the armature coils 2 as they have an inductive component. When the power transistor T1 is supplied with an OFF signal, the same process as described above takes place.

The conversion circuit 13 comprises an inverter circuit 21, including transistors T2, T3, T4, T5, T6 and T7, and an inverter control circuit 22 that performs a pulse width modulation control. The conversion circuit 13 is connected to the output side of the smoothing capacitor C, and has functions of converting the output from the voltage step-up and rectifying circuit 12 into a three-phase AC power by the pulse width modulation control and of lowering the voltage. That is, the inverter circuit 21 converts a DC power into a three-phase AC power of a desired frequency. The output side of the conversion circuit 13 is connected in series with an inductance L, through which the three-phase AC power is output as a commercial power supply 11. At this time, the inductance L connected to the output side of the inverter circuit 21 forms a reactor to smooth the output power.

Next, by referring to FIG. 1 and FIG. 2, the first embodiment of the synchronous generator of this invention will be explained.

Figure 1:
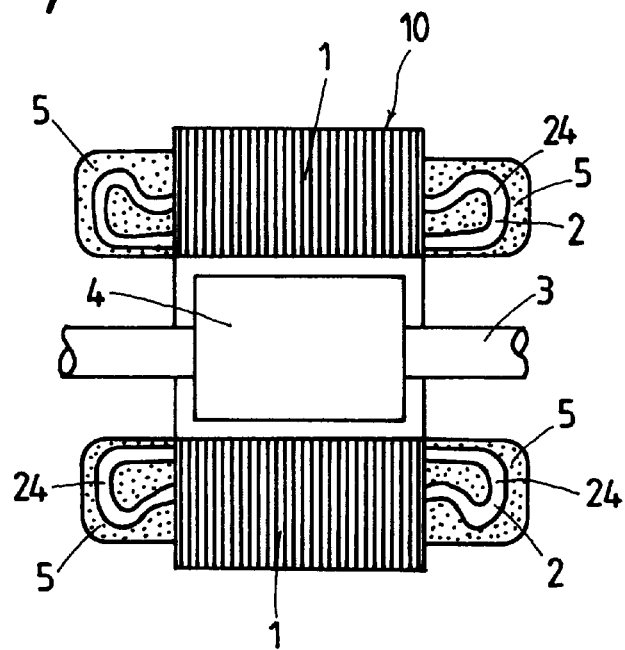
FIG. 1 is a schematic view showing a synchronous generator as the first embodiment of this invention.
Figure 2:
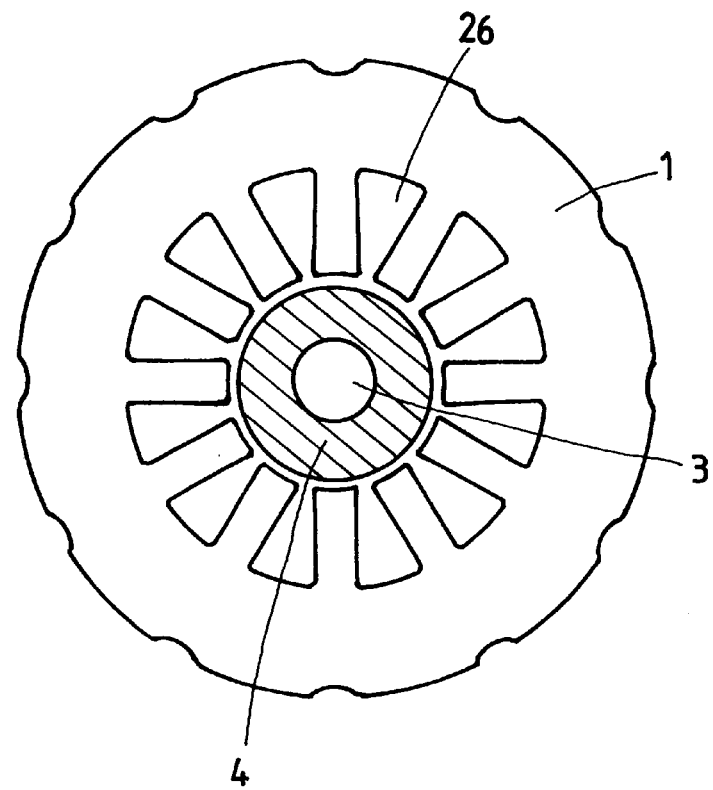
FIG. 2 is a side view of the synchronous generator of FIG. 1.

As shown in FIG. 1 and 2, the synchronous generator 10 has slots 26 in the armature 1, in each of which the armature coil 2 is inserted. A rotor 4 is mounted on a rotating shaft 3.

Although it is shown to be a permanent magnet, the rotor 4 may be of a field winding type. The coil end portions 24 of the armature coils 2 outside the armature 1 are covered with magnetism shorting paths 5.

In the first embodiment, the magnetism shorting paths 5 are formed by making a mixture of a thermosetting resin and a soft magnetic powder (for example, ferrite), molding the coil end portions 24 of the armature coils 2 with the mixture and hardening the molded resin.

The second embodiment of the synchronous generator of this invention will be described by referring to FIG. 3.

Figure 3:
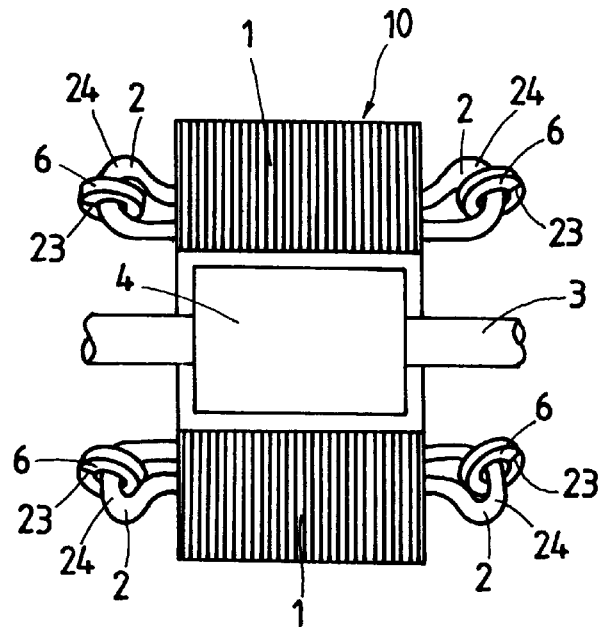
FIG. 3 is a schematic view showing a synchronous generator as the second embodiment of this invention.

As shown in FIG. 3, the synchronous generator 10 of the second embodiment is basically similar to the first embodiment, and thus the components identical to those of the first embodiment are assigned the same reference numbers and their explanations are omitted. What differs from the first embodiment is the magnetism shorting paths at the coil end portions 24 of the armature coils 2. The second embodiment, as shown in FIG. 3, has magnetic rings 6 fitted to the coil end portions 24 of the armature coils 2. The magnetic ring 6 is made by mixing the flexible material with a powder of soft magnetic material such as ferrite and forming the mixture into a ring. The ring is then formed with a notch 23, through which the ring is fitted to the armature coils 2.

Lastly, by referring to FIG. 4 and 5, the third embodiment of the synchronous generator of this invention will be described.

Figure 4:
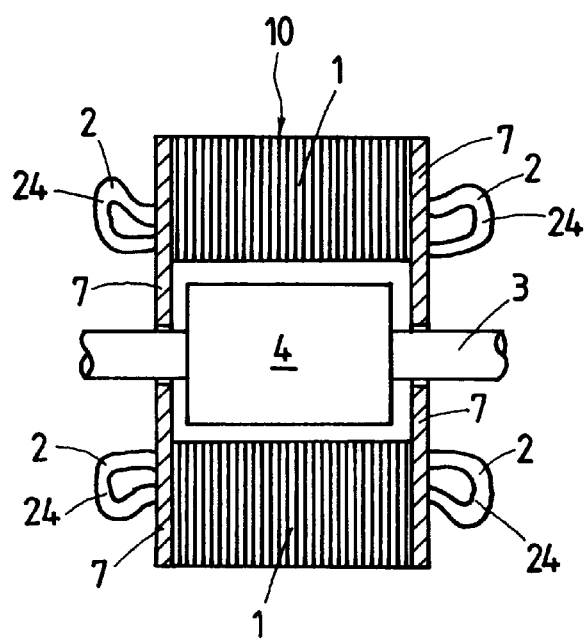
FIG. 4 is a schematic view showing a synchronous generator as the third embodiment of this invention.
Figure 5:
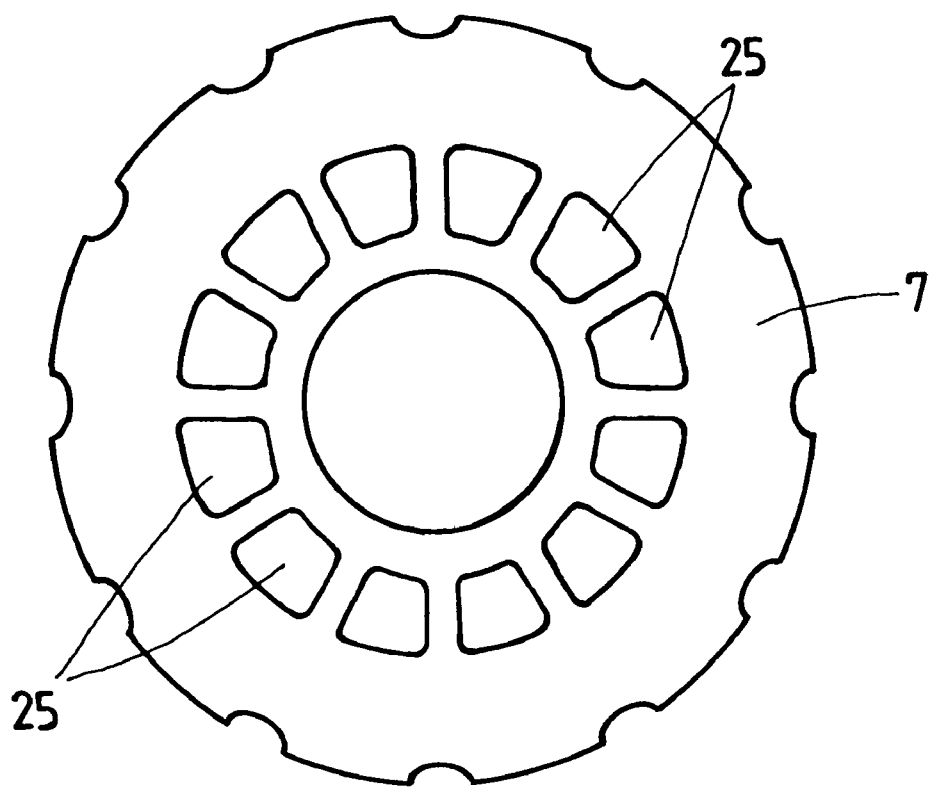
FIG. 5 is a plan view of an armature end plate in the third embodiment.

As shown in FIG. 4 and 5, the synchronous generator 10 of the second embodiment is basically similar to the first embodiment, and thus the components identical to those of the first embodiment are assigned the same reference numbers and their explanations are omitted. What is different from the first embodiment is that the magnetism shorting paths in the third embodiment are formed by armature end plates (stator end plates) 7 provided at the ends of the armature 1.

The armature end plate 7 is made of high silicon steel or soft magnetic material that has high permeability, good frequency characteristic and small magnetic loss. As shown in FIG. 5, the front end portions of the slots 25 corresponding to the slots (reference number 26 of FIG. 2) of the armature coils 2 are not open.

Next, the operation of the synchronous generators of these embodiments will be described.

In the synchronous generator of the first embodiment, the leakage fluxes at the coil end portions 24 of the armature coils 2 pass through the magnetic paths of the magnetism shorting paths 5, equivalently increasing the inductance. This inductance can be changed freely by changing the material and amount of the magnetic powder mixed in the magnetism shorting paths 5.

The operations of the asynchronous generators of the second and third embodiment are basically the same as that of the first embodiment. In the case of the second embodiment, the use of the magnetic ring 6 enables the synchronous generator to be implemented more easily than the first embodiment but the increase in inductance is smaller than that of the first embodiment.

In the synchronous generator of the third embodiment, the front end portions of the slots 25 of the armature 1 are not open and thus the leakage flux is produced. But by attaching the armature end plate 7, whose slot end is not open, to the end of the armature, the leakage flux can be reduced and therefore the inductance increased.

The inductance can be further increased by combining the structures of the synchronous generators of the first and third embodiment or the structures of the second and third embodiment.

Constructed as described above, the synchronous generator of this invention can improve the frequency characteristic of the inductance equivalently formed in series with the armature coils 2 and also increase and freely set the value of the inductance by providing to the coil end portion 24 the structure for increasing the value of and improving the frequency characteristic of the leakage inductance, without changing the armature coil structure that meets the required generation characteristic. It is therefore possible to realize the synchronous generator construction suited for the step-up chopper. In a power supply system in which a synchronous generator 10 as an electric power source is driven by a power source whose revolution speed varies in a very wide range, the output voltage of the synchronous generator can be kept constant and a stable electric power be supplied by forming the step-up chopper without using external inductance and by regulating the voltage step-up factor to minimize variations of the generated voltage. Because the external inductance is not used, the installation space and fabrication cost can be reduced.

The synchronous generator 10 of this invention, when used as a power supply in transport systems driven by engines, such as automobiles, aircraft and ships, offers significant advantages of being able to supply stable power to electric equipment mounted on the transport systems and reduce the installation space and cost.

What is claimed is:

1. A synchronous generator comprising, a step-up chopper using leakage inductance of armature coils of an armature, a voltage step-up and rectifying circuit to control by using the step-up chopper a voltage step-up factor according to a generated voltage to stabilize the generated voltage even when a rotation variation occurs, and magnetism shorting paths provided to the armature to easily pass only the fluxes produced by currents flowing in the armature coils, wherein the magnetic shorting paths are made of a hardening resin and provided at coil end portions of the armature coils, the hardening resin being mixed with a powder of soft magnetic material of ferrite.

2. A synchronous generator comprising, a step-up chopper using leakage inductance of armature coils of an armature, a voltage step-up and rectifying circuit to control by using the step-up chopper a voltage step-up factor according to a generated voltage to stabilize the generated voltage even when a rotation variation occurs, and magnetism shorting paths provided to the armature to easily pass only the fluxes produced by currents flowing in the armature coils, wherein the magnetic shorting paths comprise magnetic rings with a notch and are fitted to the coil end portions of the armature coils through the notch.

3. A synchronous generator according to claim 2, wherein the voltage step-up and rectifying circuit comprises a three-phase full-wave rectifying circuit having first diodes, a power transistor connected in parallel to an output side of the three-phase full-wave rectifying circuit and forming a switching device that performs a voltage step-up chopping, a second diode connected to a positive output side of the power transistor, a voltage detection circuit to detect a voltage output from the second diode, and a voltage step-up control circuit to control the power transistor.

4. A synchronous generator according to claim 3, wherein when the generated voltage after being DC-converted on the output side of the second diode does not reach a target voltage, the voltage step-up control circuit performs ON/OFF operations on the power transistor to increase the generated voltage.

5. A synchronous generator according to claim 3, wherein the magnetic shorting paths comprise armature end plates mounted to the armature and connecting ends of teeth, the armature end plates are formed of high silicon steel or soft magnetic material with high permeability and good frequency characteristics, and the armature end plates pass only magnetic fluxes generated by the armature coils, eqiivalently establishing a state where inductance is inserted in series with the armature coils.

6. A synchronous generator according to claim 2, wherein when the generated voltage after being DC-converted on the output side of the second diode does not reach a target voltage, the voltage step-up control circuit performs ON/OFF operations on the power transistor to increase the generated voltage.

* * * * *